United States Patent [19]
Dougherty et al.

[11] Patent Number: 6,057,666
[45] Date of Patent: May 2, 2000

[54] METHOD AND CIRCUIT FOR CONTROLLING CHARGING IN A DUAL BATTERY ELECTRICAL SYSTEM

[75] Inventors: Thomas J. Dougherty, Waukesha; William P. Segall, Grafton; Michael E. Iverson, Milwaukee; Dan L. Watts, Germantown, all of Wis.

[73] Assignee: Johnson Controls Technology Company, Plymouth, Mich.

[21] Appl. No.: 09/179,709

[22] Filed: Oct. 27, 1998

Related U.S. Application Data

[63] Continuation-in-part of application No. 08/932,950, Sep. 17, 1997.
[60] Provisional application No. 60/063,516, Oct. 27, 1997.

[51] Int. Cl.[7] .................................. H02J 7/00; H02J 7/12
[52] U.S. Cl. ........................................... 320/104; 320/162
[58] Field of Search ................................. 320/103, 104, 320/162

[56] References Cited

U.S. PATENT DOCUMENTS

| | | | |
|---|---|---|---|
| 4,583,035 | 4/1996 | Sloan | 320/22 |
| 5,130,659 | 7/1992 | Sloan | 324/435 |
| 5,162,164 | 11/1992 | Dougherty et al. | 429/9 |
| 5,162,720 | 11/1992 | Lambert | 320/104 |
| 5,223,351 | 6/1993 | Wruck | 429/9 |
| 5,332,958 | 7/1994 | Sloan | 320/13 |
| 5,525,891 | 6/1996 | Meyer et al. | 350/15 |
| 5,717,309 | 2/1998 | Cho | 320/15 |
| 5,744,937 | 4/1998 | Cheon | 320/125 |
| 5,757,658 | 6/1998 | Hayes | 320/104 |

FOREIGN PATENT DOCUMENTS

| | | |
|---|---|---|
| 0 753 925 A2 | 1/1997 | European Pat. Off. |
| 41 38 943 C1 | 5/1993 | Germany. |
| 2 128 044 | 4/1984 | United Kingdom. |
| 2 302 622 | 1/1997 | United Kingdom. |
| WO 88 08380 | 11/1988 | WIPO. |

OTHER PUBLICATIONS

European Patent Office search report on PCT Appln. No. PCT/US98/22789, dated Feb. 1, 1999.
English Translation of EP 0 753 925 A2.

*Primary Examiner*—Peter S. Wong
*Assistant Examiner*—Gregory J. Toatley, Jr.
*Attorney, Agent, or Firm*—Quarles & Brady LLP

[57] ABSTRACT

A control circuit for controlling the recharging of two batteries in a dual battery vehicle electrical system includes a charging circuit (20) for stepping up the voltage of a reserve battery (RES.), so that it can be applied to a starting battery (HPB), an alternative circuit path (18, 19) to allow charging of both batteries by the alternator (A) when the vehicle engine is running, and a controller (30) for switching the connection of the batteries through the charging circuit (20) and the alternative circuit path (18, 19) under various combinations of conditions.

18 Claims, 3 Drawing Sheets

METHOD AND CIRCUIT FOR CONTROLLING CHARGING IN A DUAL BATTERY ELECTRICAL SYSTEM

CROSS-REFERENCE TO RELATED APPLICATIONS

This is a continuation-in-part of copending U.S. patent application Ser. No. 08/932,950, filed Sep. 17, 1997 and entitled "Battery Charge Maintenance System and Method." In addition, the benefit of U.S. Provisional Application No. 60/063,516, filed Oct. 27, 1997, and entitled "Dual Battery Electrical System" is claimed herein.

TECHNICAL FIELD

The present invention relates generally to motor vehicle electrical systems and more particularly to a dual battery electrical system for supplying electrical energy to the motor vehicle and for maintaining the charge of the dual battery system.

BACKGROUND ART

Typically, vehicles powered by internal combustion engines have an electric starter motor for starting the engine. The starting motor is electrically connected to a starting circuit which receives electrical energy from an electric storage battery. When an ignition keyswitch is operated, power from the battery is supplied to the starting motor to turn over the internal combustion engine. In common vehicle applications, devices such as engine control electronics, lighting systems, and vehicle accessories, which present an electrical load to the battery, or to alternator, when the vehicle engine is running.

Traditional batteries are often referred to as starting, lighting and ignition (SLI) batteries. In design and construction, these are multi-cell, lead-acid batteries, which are constructed from lead plates carrying active material and arranged into stacks. The stacks are inserted into partitioned cell compartments of a battery container, electrically connected, and flooded with dilute acid electrolyte.

Starting requires high power output for a short time period. SLI batteries of this construction are more than adequate for providing the relatively high power demand required for engine starting.

Maintaining electrical loads in the vehicle both during vehicle operation and during periods of non-operation requires a relatively lower power demand than starting. Therefore, SLI battery design is difficult as an SLI battery must be to optimized to perform, both short duration high-power output and long duration low-power output. An additional drawback of SLI batteries is relatively low specific energy (kilo-watt hours/grams (kWh/g)) as compared to other battery constructions owing to the weight of the lead plates and the liquid electrolyte.

More recently vehicle power systems have incorporated two batteries. A first battery in the system, a starting battery, is optimized for engine starting, that is, designed specifically for short duration, high-power output. A second battery in the system, a reserve battery, is optimized for operating and maintaining non-starting electrical loads. An advantage of such a system is that the starting battery may be made smaller and lighter yet capable of provide a high power output for a short period of time. In addition, the reserve battery may be made smaller and lighter, yet capable of satisfying the relatively low power requirements of the vehicle accessories. In combination, the two battery system can be designed to occupy less space and weigh less than a single traditional SLI battery.

Dual battery systems require control circuits to maintain the charge of both batteries in the system. Typically, the vehicle includes a regulation device which regulates the output of the alternator in response to the charging needs of the SLI battery and the vehicle electrical loads. In a dual battery system, each battery type delivers power and accepts charge at a different rate. For example, the starting battery delivers power at a very high rate and likewise accepts charge at a high rate. In contrast, the reserve battery delivers power at a lower rate and accepts charge at a lower rate. Each battery will typically exhibit a different state-of-charge, and hence require different charge maintenance. Additional advantages may also be attained by selectively coupling or decoupling the batteries during non-operational, starting and operational periods of the vehicle. However, careful management is required so as not to damage either the vehicle electrical system or the dual battery system.

Therefore, a dual-battery system for vehicle starting and operation that provides the advantages of reduced size and weight and includes power and charge management is needed.

Dougherty et al., U.S. Pat. No. 5,162,164, discloses a dual battery system in which two batteries are contained in a single casing. Thus, it should be understood that the identification of two batteries means, without limitation, containment in either separate casings or in one casing

SUMMARY OF THE INVENTION

The present invention provides a control circuit for a dual energy supply storage system for a vehicle. While the invention is described in terms of two batteries, it also contemplates systems in which a starting battery is replaced with a starting capacitor. The term "charge energy source" shall be used to include batteries, capacitors and other types of equivalent charge energy sources.

In various preferred embodiments of the present invention, battery control electronics, vehicle control electronics and combinations of the these electronic control devices are utilized for battery charge management and enhanced system performance. For example, the system is adaptable to automatically determine charge status of the batteries in the system and to couple, as appropriate, the battery or batteries with sufficient charge to operate essential vehicle electrical loads and to provide energy for starting.

In addition, a preferred charge management strategy reduces the potential for overcharging one or more of the system batteries yet maintains each of the batteries at a ready state of charge.

These and other advantages and objects of the invention will be appreciated from the description that follows, in which reference is made to the accompanying drawings, which are a part of the teaching of the invention, and in which a preferred embodiment of the invention is illustrated. The description and illustration of the preferred embodiment is by way of example and not by way of limitation. For the various embodiments of the invention within the scope of the invention, reference is made to the claims which follow the description.

DETAILED DESCRIPTION OF THE PREFERRED EMBODIMENT

Figure 1:
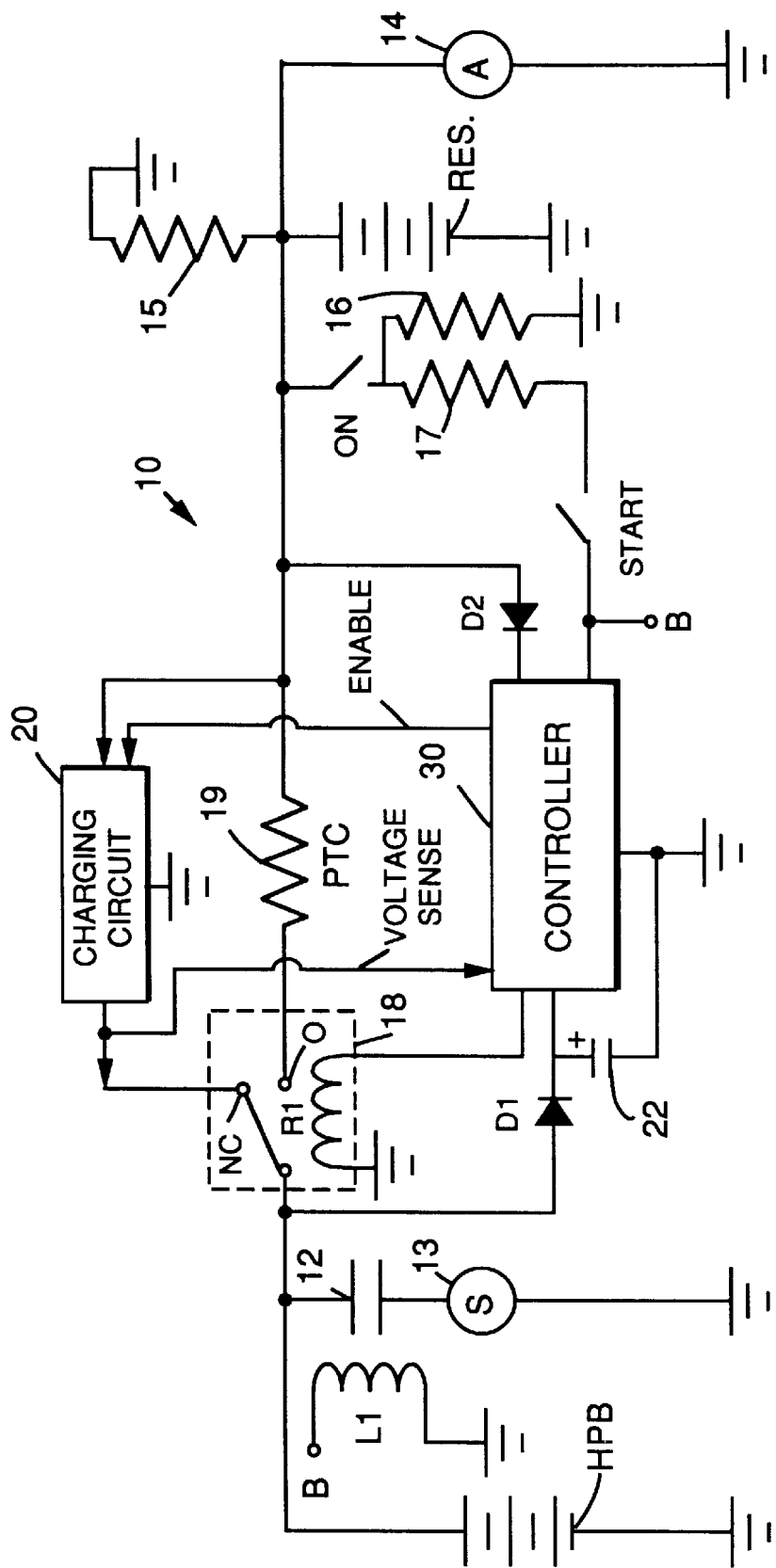
FIG. 1 is a block diagram illustration of a dual battery system adapted to an electrical system of a motor vehicle in accordance with a preferred embodiment of the present invention.

Referring to FIG. 1, a vehicle electrical system 10 includes a starting battery, also referred to as a high power battery (HPB). This refers to the high instantaneous or short burst of power which is needed to start the vehicle. The starting battery HPB is connected through a pair of switch contacts 12 to an electrical starter motor (S) 13. The starter motor 13 is mechanically coupled to the internal combustion engine (not shown) through an output shaft (not shown), and when starter motor 13 is rotated, it turns over the internal combustion engine to begin combustion of fuel in the presence of a spark.

The starting battery HPB is preferably a battery of recent technology which provides the necessary high starting power in a smaller package than traditional SLI batteries. Such a new type of starting battery is shown and described in copending U.S. Pat. App. Ser. No. 08/870,803, filed Jun. 6, 1997, assigned to the assignee of the present invention and entitled "Modular Electric Storage Battery," the disclosure of which is hereby expressly incorporated herein by reference. Such a starting battery should typically provide 800 amps of current at a cranking voltage of 10.0 volts for startup, and have 4.5 amp-hours of reserve energy capacity.

The vehicle electrical system 10 also includes a reserve battery (RES.) which is preferably of the absorptive glass mat (AGM) type construction having high reserve capacity. The reserve battery RES. is adapted to provide a relatively low rate discharge for an extended period of time. The reserve battery typically may have a rating of twenty-three amp-hours of energy storage capacity, and a rating output of twenty-five amps at a nominal voltage of eleven volts.

Next to the reserve battery RES. is a conventional alternator (A) 14 which is a type of electrical generator driven by the internal combustion engine, to supply rectified DC power for charging the batteries and for operating other loads in the vehicle.

An ignition keyswitch with two switch positions "On" and "Start" is represented by two switches ON and START with corresponding labels in FIG. 1. The vehicle reserve battery RES. is connected to some resistive loads 15 (trunk light, for example), even when the ON switch is open (the "Off" position). Resistive load 16 represents the vehicle loads when the ignition keyswitch is operated to close the ON switch, which stays closed, during and after starting. The START switch is closed during starting, to supply electrical power from the alternator 14 through resistance 17, and is then opened.

Essential vehicle loads may include such loads as the vehicle engine/power train controller, lighting systems, braking system controller, safety system controller and the like which are powered during vehicle operation. Other vehicle loads may include entertainment systems, convenience features and others which are not essential or required for vehicle operation.

When the ignition keyswitch is moved to the "Start" position ("START" switch and "ON" switch closed), an ignition coil L1 is energized to close the starting contacts 12, and energy is supplied from the starting battery HPB to the starting motor 13.

During times when the vehicle engine is off, and at times after the vehicle is started, it is desired to charge the starting battery HPB. When the vehicle is being operated, such recharging of the battery is provided by the alternator 14. When the vehicle is off, such recharging can now be provided by the reserve battery RES.

In order to control the voltage and rate of charging of the starting battery HPB, it is coupled through a charging circuit 20, including a voltage boost circuit 21 to be described below. The charging circuit 20 is electrically connected to the starting battery HPB through a relay 18 having a normally closed (NC) position and an open (O) position represented by respective contacts "NC" and "O". With the relay 18 in the normally closed condition, the charging circuit 20 is connected to one side to the starting battery HPB. In order to be operable, however, the charging circuit 20 must also be connected to the reserve battery RES. to receive power, and the charging circuit 20 must be enabled by a signal on an ENABLE line running from an electronic controller 30. With the relay 18 energized, the charging circuit 20 is bypassed through an alternative circuit path including an optional PTC (positive temperature coefficient) resistance 19. This PTC resistance 19 acts as a time-dependent fuse and provides what is effectively an open circuit at certain thresholds of current flowing for corresponding periods of time, and then resets after current decreases sufficiently. A 9-amp polyswitch available from Raychem is one example of a suitable component for use for this purpose. The controller 30 is also connected to relay coil R1 to operate the relay 18. The controller 30 is further connected to sense the state of the keyswitch at one input. The controller 30 is also connected through diodes D1 and D2 to receive power from the batteries HPB, RES. A power supply capacitor 22 connects to the cathode of diode D1 in the circuit path coming from the starting battery HPB.

Controller 30 operates in accordance with a set of logic states or conditions, the logic and programming of which will be further explained below.

Figure 2:
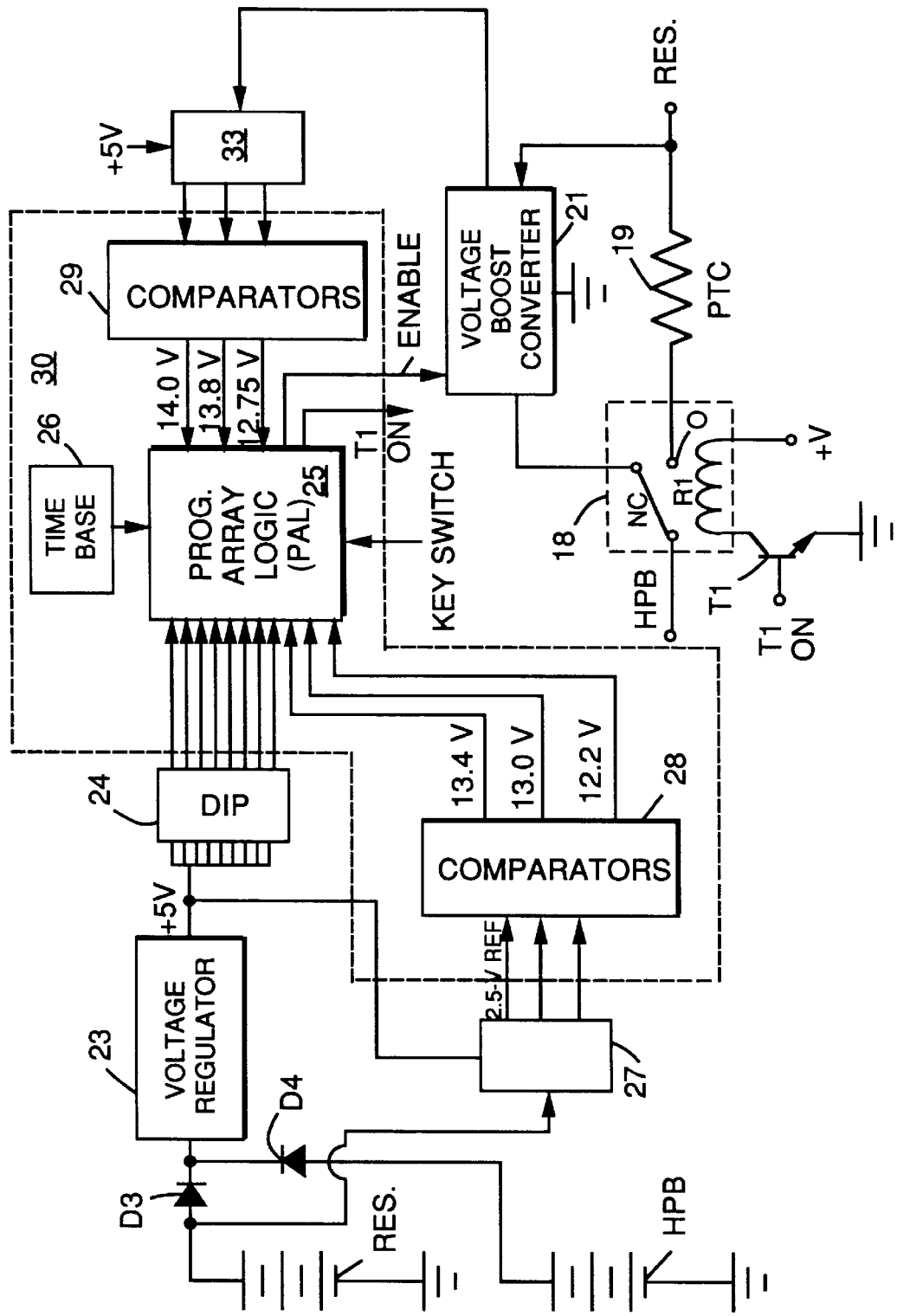
FIG. 2 is a detailed schematic illustration of a dual battery system controller in accordance with a preferred embodiment of the present invention.
Figure 3:
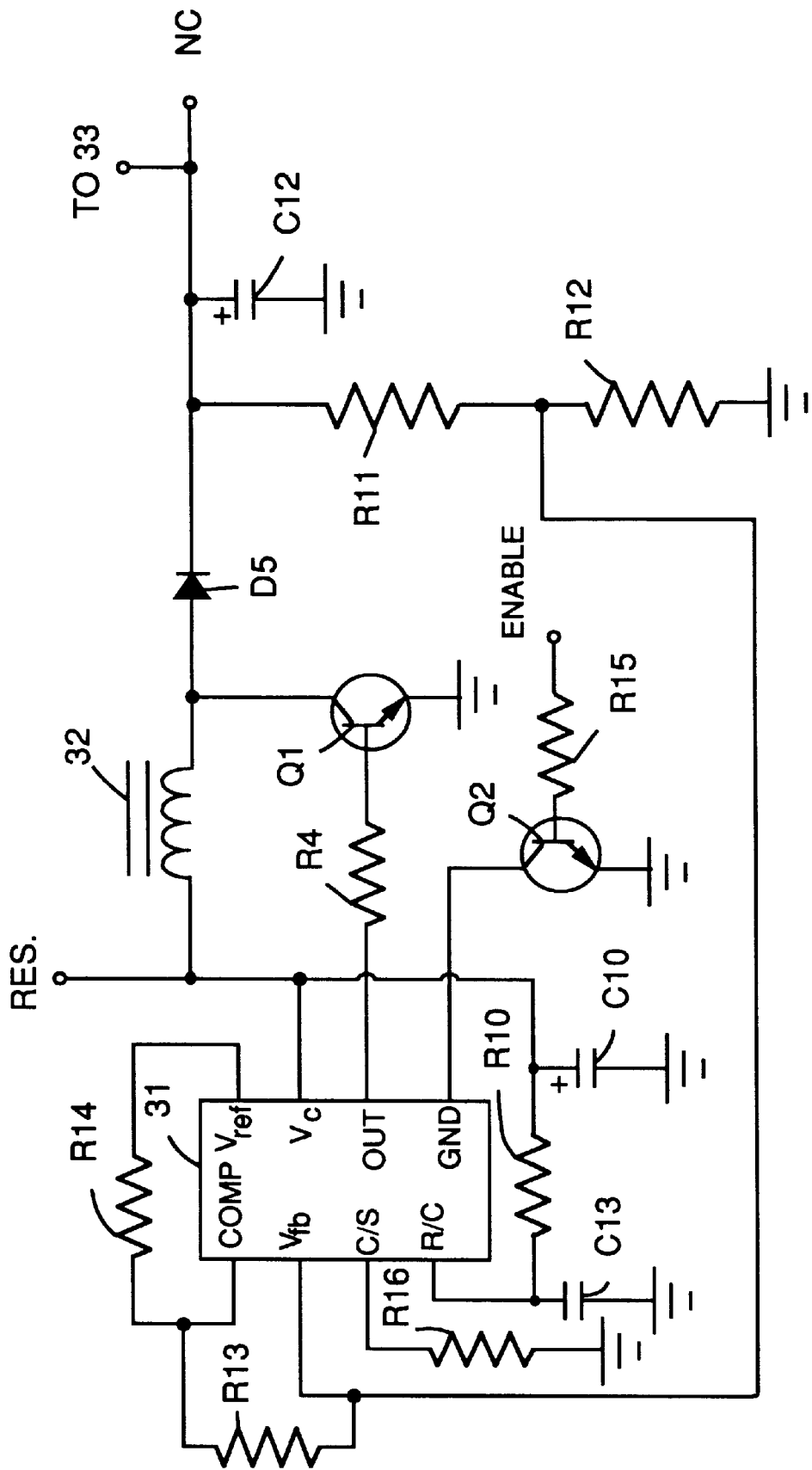
FIG. 3 is a detailed schematic diagram of a voltage boost circuit seen in FIG. 2.

Referring next to FIG. 2, the vehicle electrical system 10 is shown in further detail concerning the charging circuit 20 and electronic controller 30. A detailed schematic of the voltage boost circuit 21 is illustrated in FIG. 3.

The reserve battery RES. connects through diode D3 to a voltage regulator 23 for providing a +5-volt voltage supply for powering electronics in circuitry shown in FIG. 2. A DIP switch 24 and pull-up resistors (not shown) are provided to provide a plurality of inputs to a programmable array logic (PAL) circuit 25 which provides the control logic for the overall circuitry shown in FIGS. 1 and 2. The PAL circuit is preferably a PALCE22V10Z-25IP integrated circuit, available from Vantis, a successor of Advanced Micro Devices. A time base generator circuit 26 provides timing signals to the PAL circuit 25. The circuit 26 includes an ICM 7555 integrated timer circuit available from Harris Semiconductor. This circuit provides timing signals, such as a pulse train with a 5-second periodic waveform that is counted by the PAL circuit 25 to time longer delay periods.

The reserve battery RES. has its output connected to a divider circuit 27 for scaling the output to a +2.5-volt nominal level. The divider circuit 27 is provided by four pairs of two resistors in series, which forms a precision voltage divider with four ratios determined by the desired trip point of comparators 28. The comparators 28 are TCL2252IP dual op amps available from Texas Instruments. The comparators 28 compare the output of the reserve battery RES. to various thresholds including 12.2 DC volts, 13.1 DC volts and 13.4 DC volts, the significance of which will be explained below. The outputs of the comparators 28 are connected to inputs on the PAL circuit 25 to sense the voltage of the reserve battery RES.

The starting battery HPB in FIG. 2 is connected to the HPB switch input of the relay 18 seen in FIG. 2. The normally closed (NC) terminal in FIG. 2 is connected to a voltage boost circuit 21, which is a more detailed embodiment of the charging circuit 20 in FIG. 1. The voltage boost circuit 21 translates or converts the voltage of the reserve battery from its level at 13.1 to 13.4 volts up to a level such as 14.0 volts, representing the fully charged condition of the starting battery HPB. The voltage of the starting battery is sensed through the voltage boost circuit connection and through another set of comparators 29, which detect thresholds such as 14.0 DC volts, 13.8 DC volts and 12.75 DC volts for the starting battery HPB, the significance of these thresholds being explained below. The same type of commercial circuits can be used for comparators 29, as were described above for comparators 28. A second voltage divider circuit 33 is connected between the output of the voltage boost converter 21 and the inputs to the comparators 29. The voltage divider circuit 33 is formed of resistor pairs to scale the comparator trip points to a nominal +2.5 volts.

FIG. 2 shows that the PAL circuit 25 controls operation of the relay 18 through a TI ON signal which is applied to a base of a transistor T1 to switch on the transistor T1 and allow current flow through the relay coil R1.

FIG. 3 shows the voltage boost circuit 21, which is constructed around a pulse width modulator (PWM) circuit 31, which is provided by a UC3844N integrated circuit available from Unitrol and by a 20 μH inductor 32. The inductor 32 is connected on one side to the Vc pin on the PWM circuit 31 and on its other side to a collector of a transistor Q1. An output pin on the PWM circuit controls the base of transistor Q1 for switching the transistor Q1. The output of the inductor 32 is connected through diode D5 to the NC contact of the relay 18 (FIG. 2). The PWM circuit 31 is enabled through an ENABLE line from the controller 30 which switches on a transistor Q2 to provide a ground path for PWM circuit 31. The PWM circuit 31 has appropriate biasing networks to control the signal from the OUTPUT terminal which controls the output of the inductor 32. The inductor 32 has the voltage of the reserve battery RES. fed to an input side, and the output is controlled by the PWM circuit 31. The switching on and off of the PWM circuit causes the voltage at the output of the inductor to increase to a level higher than the 13.1 to 13.4 volts seen at the reserve battery. The switching produces an output voltage of about 14.0 DC volts. The output of the inductor 32 is coupled to the comparators seen in FIG. 2 for sensing the voltage level of the starting battery. The output of the inductor 32 is also connected to the normally closed (NC) contact of the relay 18 which, when the relay in the normally closed state, is connected to the starting battery HPB.

OPERATION

The vehicle engine is defined as having three states: 1) rest, 2) starting and 3) running. The controller 30 senses these states by sensing the state of the ignition switch represented by the ON and START switches in FIG. 1.

When the vehicle is at rest and the voltage of the starting battery decreases to a preselected level, such as 12.75 DC volts, this signifies that the vehicle has been off for an extended period of time such as one month. Then, the charging circuit 20 is enabled to allow reserve battery RES. to charge the starting battery HPB, provided the reserve battery is at a voltage of at least 12.2 DC volts signifying its charge level. One of the comparators 28 senses the 12.2-volt threshold for the reserve battery RES. One of the comparators 29 senses the 12.75-volt threshold for the starting battery HPB. The charging circuit 20 is enabled for a period of time determined by logic in the PAL 25 and voltage sensing of the HPB battery.

When the vehicle engine is running, this is sensed by the controller 30, and provided that the reserve battery RES. voltage exceeds the +13.4-volt upper threshold, the relay 18 will be energized to cause the relay moveable contact to contact the open position contact. During this twenty minute period, charge will flow from the alternator 14 to both the reserve battery RES. and the starting battery HPB through the PTC resistor 19. When the timer times out or when the reserve battery falls below the 13.1-volt threshold, this indicates the reserve battery is too low to be used to recharge the starting battery. The relay 18 will be in the normally closed (NC) position, but the ENABLE signal to the charging circuit 20 will be disabled to disconnect the starting battery 14 from receiving charge from the reserve battery RES. This will allow the alternator 14 to charge the reserve battery RES. and it will protect against discharge through the starting battery HPB. Conversely, if the starting battery voltage rises above the 14.0-volt threshold for greater than a predetermined period of time, this represents a fully charged condition for the starting battery HPB and it will no longer accept charge from the reserve battery RES., so the relay 18 will be de-energized and the charging circuit 20 is disabled to protect the charge condition of the reserve battery RES. and to prevent overcharging of the starting battery.

When the charge on the starting battery HPB falls below 13.8 volts, and assuming the vehicle engine is running, the PAL circuit 25 will energize the relay 18 to allow the charging of the starting battery HPB from the alternator 14 through PTC resistor 19.

A third function is provided when the car is starting. If the controller 30 senses that the reserve battery is below some threshold such that the reserve battery is dead, it will not start on the first operation of the ignition switch, but will start on the second try.

It should be appreciated that in an alternate embodiment, the components shown within the dashed lines in FIG. 2 as the controller 30 can be replaced with an equivalent microelectronic CPU, suitably programmed to provide the functions described herein. Some external timing circuit would be required to provide timing signals to such a CPU circuit. Such a circuit may have analog-to-digital inputs for sensing battery voltage levels.

And, while in the illustrated embodiments, a relay 18 is the switchable device controlling the connection of the starting battery HPB to various charging sources, it should be understood that various types and numbers of semiconductor devices could be substituted to perform this function without departing from the scope of the invention.

It will be appreciated that threshold voltages are representative of preferred voltages and that various vehicle systems may require different voltage thresholds. Likewise, the various timer values are representative of preferred values although other values may be chosen without departing from the scope of the present invention. Furthermore, it will be understood that other details of the preferred embodiment and the alternate embodiment may be varied without departing from the scope of the invention as defined by the following claims.

We claim:

1. A circuit for controlling the charging of a starting charge energy source in a vehicle and for controlling a supply of charge from a reserve charge energy source in the vehicle, the circuit comprising:

a charging circuit in a circuit path between the starting charge energy source and the reserve charge energy source for converting a voltage of the reserve charge energy source to a voltage necessary to fully charge the starting charge energy source;

a controller operably connected to sense the level of charge on starting charge energy source and on the reserve charge energy source, said controller enabling and disabling the charging circuit to connect and disconnect the starting charge energy source to the charging circuit in response to the level of voltage on the starting charge energy source, in response to the level of voltage on the reserve charge energy source, and in response to an on-off state of a vehicle engine; and a switchable device connected in the circuit path from the starting charge energy source to the reserve charge energy source, said switchable device being switchable to disconnect the starting charge energy source from the charging circuit and to connect the starting charge energy source to the reserve charge energy source and an alternator.

2. The circuit of claim 1, wherein the controller is further operable to connect the reserve charge energy source to the starting charge energy source through the charging circuit in response to a vehicle off condition as represented by a level of voltage on the starting charge energy source.

3. The circuit of claim 1, wherein the controller is further operable to coupling the charge current from the reserve charge energy source to the starting charge energy source for a predetermined time period in response to a vehicle on condition.

4. The circuit of claim 1, wherein the switchable device is a relay.

5. The circuit of claim 1, further comprising a circuit path from the alternator to the starting charge energy source, and further comprising a current limiting device in said circuit path.

6. The circuit of claim 5, wherein the current limiting device is a positive temperature coefficient resistance in said circuit path.

7. The circuit of claim 1, wherein the controller includes a programmable logic circuit and a timing circuit.

8. The circuit of claim 1, wherein the starting charge energy source is optimized for a high rate of discharge during vehicle starting operations.

9. The circuit of claim 1, wherein the reserve charge energy source is optimized for total energy capacity.

10. The circuit of claim 1, wherein the controller is operable to detect a voltage potential of one of the starting charge energy source and the reserve charge energy source with respect to a threshold and to selectively decouple the reserve charge energy source from the starting charge energy source upon detection of said voltage potential relative to said threshold.

11. The circuit of claim 10, wherein the threshold represents a fully charged condition for the starting charge energy source.

12. The circuit of claim 10, wherein the threshold is a battery low condition for the reserve charge energy source.

13. The circuit of claim 1, wherein the starting charge energy source is a battery.

14. The circuit of claim 1, wherein the reserve charge energy circuit is a battery.

15. A method for controlling the charging of a starting charge energy source in a vehicle and for controlling a supply of charge from a reserve charge energy source in the vehicle, the method comprising:

sensing the level of charge on the starting charge energy source;

sensing the level of charge on the reserve charge energy source;

sensing the on-off state of a vehicle engine;

electrically connecting the starting charge energy source through a charging circuit to the reserve charge energy source or electrically connecting the starting charge energy source to the reserve charge energy source and to an alternator in response to the level of voltage on the starting charge energy source, in response to the level of voltage on the reserve charge energy source, and in response to the on-off state of the vehicle engine; and converting a voltage of the reserve charge energy source to a voltage necessary to fully charge the starting charge energy source.

16. The method of claim 15, wherein the connecting of the starting charge energy source through the charging circuit is to the reserve charge energy source in response to a vehicle off condition as represented by a level of voltage on the starting charge energy source.

17. The method of claim 15, wherein the connecting of the starting charge energy source through the charging circuit is for a predetermined time period in response to a vehicle on condition.

18. The method of claim 15, further comprising detecting a voltage potential of one of the starting charge energy source and the reserve charge energy source with respect to a threshold and selectively electrically disconnecting the reserve charge energy source from the starting charge energy source upon detection of said voltage potential relative to said threshold.

* * * * *